US010194277B2

United States Patent
Marshall et al.

(10) Patent No.: US 10,194,277 B2
(45) Date of Patent: Jan. 29, 2019

(54) METHOD AND A SYSTEM FOR MANAGING A CELLULAR NETWORK DATA BASE

(71) Applicant: u-blox AG, Thalwil (CH)

(72) Inventors: Chris Marshall, Reigate (GB); Andrea Viel, Udine (IT); Federico Pittino, Sgonico Trieste (IT)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 15/722,430

(22) Filed: Oct. 2, 2017

(65) Prior Publication Data

US 2018/0098199 A1    Apr. 5, 2018

(30) Foreign Application Priority Data

Sep. 30, 2016 (EP) .................................. 16191897

(51) Int. Cl.
*H04W 4/02* (2018.01)
*H04W 64/00* (2009.01)
(Continued)

(52) U.S. Cl.
CPC .............. *H04W 4/029* (2018.02); *G01S 5/02* (2013.01); *G01S 5/0252* (2013.01);
(Continued)

(58) Field of Classification Search
CPC ... H04W 64/006; H04W 24/10; H04W 4/023; H04W 64/003; H04W 8/18; G01C 21/26;
(Continued)

(56) References Cited

U.S. PATENT DOCUMENTS

| 8,787,171 B2 | 7/2014 | Macnaughtan et al. |
| 2011/0026506 A1 | 2/2011 | Macnaughtan et al. |

(Continued)

FOREIGN PATENT DOCUMENTS

| EP | 2 469 292 | 6/2012 |
| EP | 2 775 744 | 10/2014 |

(Continued)

OTHER PUBLICATIONS

J. Benikovsky et al., "Localization in Real GSM Network with Fingerprinting Utilization" In Mobile Lightweight Wireless Systems, pp. 699-709, Springer, 2010.

(Continued)

*Primary Examiner* — Nizar Sivji
(74) *Attorney, Agent, or Firm* — Finnegan, Henderson, Farabow, Garrett & Dunner LLP

(57) ABSTRACT

A system and a method for managing a cellular network database for determining a position of a terminal device, wherein the database comprises multiple observation data sets (ODSP), wherein one or more observation data set(s) (ODSP) is/are assigned to one cell, wherein a first collection of observation data sets (ODSP) comprises at least one observation data set (ODSP) assigned to a first cell, wherein a further collection of observation data sets (ODSP) comprises at least one observation data set (ODSP) assigned to a further cell, wherein at least one cell-identifying information and at least one cell coverage-related information and/or at least one base station position-related information is determined for each collection, wherein the first collection and the further collection are assigned to one cell if at least one cell identity-related criterion and at least one cell coverage-related criterion and/or at least one base station position-related criterion is fulfilled.

20 Claims, 4 Drawing Sheets

Figure 1:
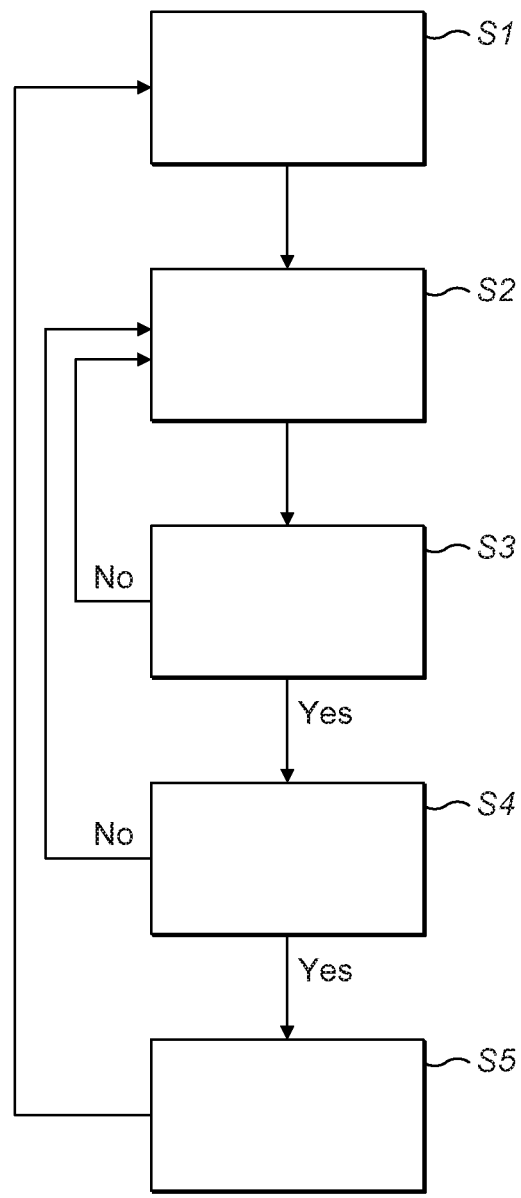

(51) Int. Cl.
*G01S 5/02* (2010.01)
*H04W 4/029* (2018.01)
*G01S 5/12* (2006.01)
*G01S 11/06* (2006.01)
*H04W 8/08* (2009.01)

(52) U.S. Cl.
CPC .............. *G01S 5/0257* (2013.01); *G01S 5/12* (2013.01); *G01S 11/06* (2013.01); *H04W 64/00* (2013.01); *H04W 64/006* (2013.01); *H04W 8/08* (2013.01)

(58) Field of Classification Search
CPC ................ G05D 1/0022; H04B 1/3822; H04B 7/18539; H04H 20/61; H04H 20/71; H04L 43/10; H04L 45/22; H04L 67/18; G01S 5/0009; G01S 5/08; G01S 5/14; G01S 13/89; G01S 5/04
See application file for complete search history.

(56) References Cited

U.S. PATENT DOCUMENTS

| | | |
|---|---|---|
| 2011/0034179 A1 | 2/2011 | Malcom et al. |
| 2014/0256348 A1 | 9/2014 | Wirola et al. |
| 2017/0160375 A1* | 6/2017 | Syrjarinne ............ G01S 5/0252 |

FOREIGN PATENT DOCUMENTS

| | | |
|---|---|---|
| WO | 2009/124348 | 10/2009 |
| WO | 2015/197107 | 12/2015 |

OTHER PUBLICATIONS

Andrea Viel et al:"Dealing with network changes in cellular fingerprint positioning systems".
Heba Aly, Dept. of Computer and Systems Engineering . . . , and Moustafa Youssef, Wireless Research Center . . . :"Dejavu: An Accurate Energy-Efficient Outdoor Localization System".
Nikos Deligiannis et al.: "Mobile Positioning based on Existing Signaling Messages in GSM Networks".
Alex Varshaysky et al.: "Calibree: Calibration-free Localization using Relative Distance Estimations".
Zhenyun Zhuang et al.: "Improving Energy Efficiency of Location Sensing on Smartphones".
Paek et al.: "Energy-Efficient Positioning for Smartphones using Cell-ID Sequence Matching".
Kjærgaard M.B. (2007) "A Taxonomy for Radio Location Fingerprinting" In: Hightower J., Schiele B., Strang T. (eds) Location- and Context-Awareness. LoCA 2007. Lecture Notes in Computer Science, vol. 4718, pp. 139-156, 2007. © Springer-Verlag Berlin Heidelberg 2007.
Michael Ficek et al.:"Can Crowdsensing Beat Dynamic Cell-ID?".
Mike Y. Chen et al.:Practical Metropolitan-Scale Positioning for GSM Phones.
Paramvir Bahl and Venkata N. Padmanabhan:"RADAR: An In-Building RF-based User Location and Tracking System".
Andrea Dalla Torre et al.:How to improve position estimation in fingerprinting systems by making use of Timing Advance information.

* cited by examiner

METHOD AND A SYSTEM FOR MANAGING A CELLULAR NETWORK DATA BASE

BACKGROUND OF THE INVENTION

1. Field of the Invention

The invention relates to a method and a system for managing a cellular network data base for determining a position of a terminal device.

2. Brief Description of the Related Art

Determining the position of a terminal device being part of a cellular network is an issue in a variety of application fields. Examples are smartphone applications involving e.g. a mobile search or social networking functions which offer or augmented services when a position of the user or a terminal device is known. Other applications which are not necessarily linked to smartphone applications may benefit from information about the position of the terminal device are e.g. asset tracking and fleet management.

Further known are so-called fingerprint-based position estimation systems. In such systems, a position of a terminal device is identified based on a fingerprint data set provided by or via a signal transmission to a base station. The document J. Benikovsky et al., "Localization in real GSM network with fingerprinting utilization, In mobile light weight wireless systems", pages 699-709, © Springer, 2010, discloses a method to estimate a current position of a terminal device using fingerprint data sets provided by a terminal device. In particular, the current position is estimated by correlating a fingerprint data set which is viewed by the terminal device at a certain time point with a set of past fingerprint data sets to which a known position are assigned, e.g. position determined via a GNSS. Such fingerprint data sets with a known position can also be referred to as observation data sets.

These fingerprint-based position determination methods use a cellular network data base in which said past observation data sets are stored. Thus, a fingerprint data set provided by a terminal device at runtime can be matched to or correlated to the observation data sets stored in the data base in order to determine the position of the terminal device.

The quality of the data base, e.g. the correctness of assignments of entries of the data base, affects the accuracy of the position determination.

Outdated entries, e.g. outdated observation data sets, or an incorrect aggregation of observation data sets being used for the determination of a position of the terminal device can thus lead to a decreased quality of the position determination.

There is the technical problem to provide a system and a method for managing a cellular network data base for determining a position of a terminal device being part of the cellular network which allows a position determination of a terminal device at runtime with an increased accuracy.

SUMMARY OF THE INVENTION

A method for managing a cellular network data base for determining a position of a terminal device is proposed. The method can be part of a method for determining a position of a terminal device. A cellular network can be a communication network wherein at least one communication link is wireless. The network can comprise so-called cells. A cell can be served by at least one fixed-location transceiver which can also be referred to a base station. A cellular network can e.g. be a GSM-based network, an UTMS-based network, a CDMA-based network, a Wi-Fi network or a WiMAX network.

Terminal devices, in particular mobile devices such as cell phones, laptops, tablets or also stationary devices such as PCs being part of the cellular network can perform a data and/or signal communication via said cellular network. In order to perform such a communication, a communication link between a terminal device and one or more base stations is established.

Further, the system and the method described herein can comprise at least data storing means and at least one data processing means, e.g. for managing the cellular network database and/or for determining the position of a terminal device and/or for controlling an operation of the cellular network. The at least one data storing means can e.g. store data sets, wherein the data sets are organized by or within a data base. The at least one data processing means can provide a data base management system which, inter alia, provides interactions means for users, other applications and the data base, e.g. in order to capture and analyze data.

The data base comprises multiple observation data sets. In other words, multiple observation data sets are stored in at least one data storing means and organized by or within said data base.

An observation data set can be provided by a terminal device or can be determined depending on observation data generated and provided by said terminal device.

It is possible that a terminal device generates observation data, wherein said observation data can comprise data encoding a current position of the terminal device and/or data encoding cell-identifying information of one, more or all cells for which a signal transmitted by the respective base station is receivable by the terminal device, i.e. which are available for data and/or signal communication by the terminal device, and/or data encoding a signal strength of a signal received from the base station of the respective cell, and/or a timing advance-related parameter if the terminal device is connected to a serving cell which provided a timing advance information and/or a time stamp of the observation data set generation, wherein the time stamp can denote the point in time at which the observation data set is generated by the terminal device. It is, of course, possible that the observation data can comprise data encoding further information. The information required for generating observation data can be determined on a terminal device side or can be provided by or via a base station of a cell. The observation data can be transmitted from the terminal device to the afore-mentioned at least one data processing means, e.g. via an observation data receiving means.

The timing advance-related parameter might only be available for a cell which is a serving cell, wherein the serving cell can be a member of the set of cells for which a signal transmitted by the respective base station is receivable by the terminal device. The terminal device can be connected to the network by means of the serving cell. In this case, the signal transmission as part of the connection can be managed by the network, wherein timing information can be provided.

Observation data can comprise one or more cell-specific observation data sets, wherein each observation data set can comprise data encoding a current position of the terminal device and/or data encoding cell-identifying information of said specific cell for which the signal transmitted by the base station of the specific cell is receivable by the terminal device and/or data encoding a signal strength of the signal received from said base station of the respective cell and/or a timing advance-related parameter if the terminal device is connected to a serving cell which provided a timing advance information and/or a time stamp of the observation data set generation.

In the following, a cell-specific observation data set is also referred to as observation data set. An observation data set can be assigned to one cell. In particular, the observation data set can be assigned to a cell for which a signal transmitted by the base station of the specific cell is receivable by the terminal device. All observation data sets which are assigned to a specific cell provide a cell-specific collection of observation data sets.

The specific cell can be a cell of the cellular network which has been observed by a terminal device at least once and for which a database entry is created or does already exist. The assignment of an observation data set to a cell of the cellular network can be provided by or within the data base.

A first collection of observation data sets comprises at least one observation data set which is assigned to a first cell. A further collection of the observation data sets comprises at least one observation data set which is assigned to a further cell. In particular, the first collection comprises all observation data sets which are assigned to the first cell, wherein the further collection comprises all observation data sets which are assigned to the further cell.

Further, at least one cell-identifying information, in particular at least one cell-identifying parameter, is determined for each collection.

The cell-identifying information is unique for all cells, in particular at a particular moment in time. It is possible that at least one cell-identifying information is assigned to or encoded by each observation data set of a collection, wherein the cell-identifying information assigned to said collection can be determined depending on the cell-identifying information assigned to or encoded by each of these observation data sets. In particular, the cell-identifying information which is assigned to a collection can be equal to cell-identifying information assigned to or encoded by each observation data set or equal to a part of said information.

It is possible that the cell-identifying information, in particular at least one cell-identifying parameter, of the first collection is different from the cell-identifying information, in particular from a (corresponding) cell-identifying parameter, of the further collection.

Cell-identifying information of two cell-specific collections can be different if the cell-identifying information comprise different parameters and/or if values of at least one corresponding parameter differ from each other. Cell-identifying information can e.g. comprise different parameters if the respective cells provide signal transmission according to different standards, e.g. according to a GSM standard and a CDMA standard.

Cell-identifying information can also comprise the same parameters, e.g. in the case that cells provide signal transmission according to the same standard, e.g. the GSM standard. In this case, cell-identifying information of two cell-specific collections can be different if values of at least one corresponding parameter differ from each other.

Further, at least one cell coverage-related information and/or at least and at least one base station position-related information is/are determined for each collection.

A cell coverage-related information can e.g. be an information on the coverage area of the respective cell, e.g. on the position and/or the size and/or the shape of said coverage area. The cell coverage-related information can e.g. be determined depending on the observation data set(s) of the cell-specific collection or its information content.

A base station position-related information can e.g. be an information on the position of the base station of the respective cell or on an area in which the base station is located, e.g. on the position and/or the size and/or the shape of said base station position area. The base station position-related information can e.g. be determined depending on the observation data set(s) of the cell-specific collection or its information content.

The position of a terminal device and/or a cell coverage area and/or of a base station and/or a base station position area can e.g. be determined within a reference coordinate system, in particular a coordinate system of a GNSS system.

If a new observation data set is provided, e.g. from observation data which is generated by the terminal device and comprises one or multiple observation data sets, this new observation data set can be integrated into the data base. In particular, the new observation data set can be assigned to a cell which can mean that the new observation data set is added to the collection of observation data sets which is assigned to said cell. Such an assignment can be performed based on at least one information encoded by the observation data set. In particular, a new observation data set can be assigned to a cell if a cell-identifying information of the observation data set corresponds to the cell-identifying information of the cell-specific collection. Further, but not mandatorily, a new observation data set can be assigned to a cell if a cell coverage-related information determined depending on the observation data set corresponds at least partially to the cell coverage-related information of the cell-specific collection and/or if a base station position-related information determined depending on the observation data set corresponds at least partially to the base station position-related information of the cell-specific collection.

It is possible that cellular networks are not static but can change properties or characteristics over time. In particular, new cells can be added to the cellular network, existing cells can be removed from the cellular network and/or redeployed and/or existing cells can be reconfigured. In particular, cells can be renamed. This can mean that the cell-identifying information, in particular at least one cell-identifying parameter, changes. A simple example of a cell renaming is a change of the so-called cell-ID (CI) which can e.g. be changed by a network operator.

With respect to the data base, the renamed cell is considered a new cell, although the base station of the renamed cell remains geographically in the same position and signals transmitted via said base station are not or not significantly altered. Further, a coverage of the renamed cell may also not be affected by the renaming. This may result in the fact that observation data sets generated by terminal device which observe the renamed cell will provide a new entry in the cellular network data base or will provide an entry which is assigned to a new cell. In other words, observation data sets related to a cell before and after renaming will be handled as observation data sets related to two different cells and may thus be assigned to two different cell-specific collections. This can lead to a decreased quality of a position determination based on the cellular network data base.

In particular, since terminal devices in the field, however, will only make observations of the renamed cell after the renaming occurred, the observation data sets which were assigned to the cell before renaming will be outdated. In particular, these observation data sets are usually not used for a position determination of a terminal device anymore.

Further, the first collection and the further collection are assigned to one cell, in particular the same cell, if at least one identity-related criterion is fulfilled.

Further, the first collection and the further collection are assigned to one cell if additionally at least one cell coverage-related criterion and/or at least one base station position-related criterion is fulfilled.

Such an assignment can be also referred to a cell merging or cell merging step.

The identity-related criterion can e.g. be evaluated based on the identity-related information. The cell coverage-related criterion can e.g. be evaluated based on the cell coverage-related information. The base station position-related criterion can e.g. be evaluated based on the base station position-related information. The cell identity-related criterion can e.g. be fulfilled if the cell identity of the first cell corresponds at least partially to the cell-identity of the further cell.

The cell-coverage related criterion can e.g. be fulfilled if a coverage area of the first cell corresponds at least partially to the coverage area of the further cell. Alternatively or in addition, the cell-coverage related criterion can e.g. be fulfilled if a distance between the coverage area of the first cell and the coverage area of the further cell is smaller than a predetermined threshold value. Said distance can e.g. be a distance between a reference point, e.g. the centroid, of the coverage area of the first cell and a reference point, e.g. the centroid, of the coverage area of the further cell.

The base station position-related criterion can e.g. be fulfilled if a distance between the position of the base station of the first cell and the position of the base station of the further cell is smaller than a predetermined threshold and/or if a base station position area of the first cell corresponds at least partially to the base station position area of the further cell.

The coverage area, the position of the base station and the base station position area can denote an estimated area or position. The estimation of said area(s) or position will be exemplarily described later.

In other words, observation data sets which are assigned to different cells are reassigned such that all observation data sets of both collections of observation data sets are assigned to the same cell, in particular to one of both cells.

It is, of course, possible that the first collection and the further collection are assigned to one cell if additionally at least one collection-related criterion is fulfilled. In particular, the first collection and the further collection can only be assigned to one cell if each of the collection comprises more than a predetermined number of observation data sets.

Evaluating the at least one cell identity-related criterion and additionally the at least one cell coverage-related criterion and/or the least one base station position-related criterion advantageously allows to merge collections which relate to the same cell before and after renaming. Assigning the observation data sets of both collections to one cell advantageously allows to combine, keep and use the information content of both observation data sets which, in turn, allows a more accurate determination of the position of a terminal device as the combined collection contains a larger amount of cell-specific observation data sets can be used for position determination, in particular since less observation data sets are discarded.

Moreover, the proposed method advantageously allows to reduce the number of cell entries in the database which reduces a search time for searching the database and thus improves a computing efficiency.

In another embodiment, the cell-identifying information of each collection comprises at least cell-identifying parameter. A cell-identifying parameter can e.g. be a mobile country code (MCC), a mobile network code (MNC), a location area code (LAC), a cell-ID (CI), a base station identity code (BSIC) and an absolute radio-frequency channel number (ARFTN).

BSCI and ARFCN can be denoted as physical parameter, wherein the remaining parameters can be denoted as logical parameters. Changes in one or both of these—the physical or logical parameters—can give rise to a different complete cell-identifying information so that the cell is regarded as a different cell.

The cell-identifying information can be provided at least one, preferably by more than one, of these parameters. Preferably, the cell-identifying information comprises at least one physical parameter and at least one logical parameter. Of course other or further parameters can be used as cell-identifying parameters.

The cell identity-related criterion is fulfilled if the at least one cell-identifying parameter of the first collection is, in particular at least partially, different from the at least one corresponding cell-identifying parameter of the further collection. Corresponding parameters can denote parameters of the same parameter type, e.g. of the type LAC. Within the renaming process, usually only one cell-identifying parameter is changed. This means that at least one cell-identifying parameter of a cell before renaming is different from the (corresponding) cell-identifying parameter after renaming.

Evaluation of the cell identity-related criterion can be performed before evaluation of the cell coverage-related criterion and/or the base station position-related criterion. An evaluation of the at least one cell identity-related criterion, allows to reliably determine candidate collections for cell merging. In other words, evaluating the cell-identifying parameter(s) advantageously allows a computationally fast identification of cell merging candidate collections and thus a computationally fast cell merging.

In a preferred embodiment, the cell-identifying information of each subset comprises more than one cell-identifying parameter, wherein the cell identity-related criterion is fulfilled if at least one cell-identifying parameter of the first collection is equal to a cell-identifying parameter, in particular to the corresponding cell-identifying parameter, of the further collection.

In particular, the cell identity-related criterion can be fulfilled if all except one, two, three or more identifying parameter(s) of the collections are equal.

This advantageously further decreases the computational time required for identifying merging candidate collections and thus for cell merging while also providing a desired quality of the merging.

In another embodiment, the cell coverage-related criterion is fulfilled if the coverage area of the first cell corresponds to the coverage area of the further cell at least partially.

The coverage area of a cell can e.g. be determined, i.e. estimated, as a function of the observation data sets which are assigned to the respective cell, in particular as a function of the position of the terminal device which generated the respective observation data set and which is encoded by the respective observation data set.

The coverage area can be determined, i.e. estimated, depending on at least one or depending on more than one but not all or depending on all observation data sets of the cell-specific collection. In particular, the coverage area can be an area comprising the position(s) of the terminal device of one, preferably more than one but not all, more preferably all observation data sets of the cell-specific collection.

The coverage area can also have a predetermined shape, e.g. the shape of a circle, a disc or a circle segment.

Further, the coverage area, in particular a coverage area with a predetermined shape, can be an area with the minimum possible size which comprises the said terminal position(s).

The coverage area of the first cell can correspond to the coverage area of the further cell at least partially if the coverage areas overlap at least partially, e.g. by a predetermined non-zero percentage, e.g. by at least 25%, 50% or 75%, of one of the coverage areas, in particular of the smaller one.

Alternatively or in addition, the coverage area of the first cell can correspond to the coverage area of the further cell at least partially if a distance between a reference point, e.g. the centroid, of the coverage area of the first cell and a reference point, e.g. the centroid, of the coverage area of the further cell, is smaller than a predetermined threshold value. It is, for example, possible that coverage areas are classified as corresponding coverage areas if they do not overlap but if the distance is smaller than a predetermined threshold.

It is possible to take account of tolerances in determining the coverage area and/or in evaluating the overlap and/or the distance. For instance, the coverage area can be estimated as an area, in particular as an area with a predetermined shape, which comprises the said terminal position(s) but is larger than said area with the minimum possible size, e.g. larger by a predetermined tolerance-dependent value or ratio. It is, for instance possible, add a tolerance margin around the area with the minimum possible size.

This advantageously allows compensating position measurement errors and/or an inaccuracy resulting from an estimation based on only a small number of observation data set.

Alternatively or in addition, the cell coverage-related criterion is fulfilled if a dimension of an area composed of the coverage area of the first cell and the coverage area of the further cell is smaller than a predetermined threshold. The cell coverage-related criterion can e.g. be fulfilled if the composed area is smaller than an area of a circle with a predetermined radius, e.g. a radius of 35 km. The radius can e.g. be chosen cell-dependent, in particular depending on the maximum size of a cell in the respective cellular network. A radius of 35 km corresponds to the maximum size of a cell in a GSM-based cellular network. This advantageously allows a comparison algorithm to handle a range of environments, from dense urban to sparse rural cellular networks.

The evaluation of the cell coverage-related criterion advantageously allows identifying a renamed cell in a reliable way.

In another embodiment, the base station position-related criterion is fulfilled if a difference between a base station position of the first cell and the base station position of the further cell is smaller than a predetermined threshold. In this context, the base station position can denote an estimated base station position.

Alternatively or in addition, the position-related criterion is fulfilled if a base station position area of the first cell corresponds to the base station position area of the further cell at least partially.

The base station position area of a cell can e.g. be determined as a function of the observation data sets which are assigned to the respective cell, in particular as a function of the position of the terminal device which generated the respective observation data set and a distance of said terminal device to the base station, wherein the position and distance information is encoded by the respective observation data set.

In particular, the base station position area can be an area in which the base station is located. A base station position area can e.g. be provided by a set of points within said area or by a bounding area of said set of points. The base station position area can also have a predetermined shape, e.g. the shape of a circle, an ellipse or a box. Further, a base station position area can be characterized by a reference point, e.g. a geometric center point, of the area and the size or geometry of that area. A base station position area with a size of 0 can correspond to a base station position.

The base station position and/or the base station position area can be determined depending on one, preferably depending on more than one but not all or depending on all observation data sets (or its information content) of the cell-specific collection. An exemplary determination, i.e. estimation, will be explained in more detail later. If a base station position area of a cell is determined, it is further possible to determine the base station position as the geometric center or the centroid of the position area.

The base station position area of the first cell can correspond to the base station position area of the further cell at least partially if the areas overlap at least partially, e.g. by a predetermined non-zero percentage, e.g. by at least 25%, 50% or 75%, of one of the base station areas, in particular of the smaller one.

Alternatively or in addition, the base station position area of the first cell can correspond to the base station position area of the further cell at least partially if a distance between a reference point, e.g. the centroid, of the base station position area of the first cell and a reference point, e.g. the centroid, of the base station position area of the further cell, is smaller than a predetermined threshold value. Similar to the cell coverage-related criterion, it is possible that base station position areas are classified as corresponding areas if they do not overlap but if the distance is smaller than a predetermined threshold.

It is of course possible to use other or further correspondence measures for measuring a correspondence between two areas.

It is possible to take account of tolerances in determining the base station position area and/or in evaluating the overlap and/or the distance. For instance, the base station position area can be estimated as an area which is larger than a base station position area with the minimum possible size, e.g. larger by a predetermined tolerance-dependent value or ratio. It is, for instance possible, to add a tolerance margin around the area with the minimum possible size. As in the case of the cell coverage-related criterion, this advantageously allows compensating position measurement errors and/or an inaccuracy resulting from an estimation based on only a small number of observation data set.

Alternatively or in addition, the position-related criterion is fulfilled if a dimension of an area composed of the base station position area of the first cell and the base station position of the further cell is smaller than a predetermined threshold. The position-related criterion can e.g. be fulfilled if the composed area is smaller than an area of a circle with a predetermined radius, e.g. a radius of 35 km. The radius can e.g. be chosen cell-dependent, in particular depending on the maximum size of a cell in the respective cellular network. A radius of 35 km corresponds to the maximum size of a cell in a GSM-based cellular network. This advantageously allows a comparison algorithm to handle a range of environments, from dense urban to sparse rural cellular networks.

The evaluation of the base station position-related criterion advantageously allows identifying a renamed cell in a reliable way.

In another embodiment, a position of the terminal device which provided an observation data set and a distance between said terminal device and the base station of the cell to which the observation data set is assigned is determined for one, preferably more than one, more preferably for all observation data sets of a cell-specific collection of observation data sets. It is possible that the observation data set comprises data encoding the position of the terminal device and data encoding the distance between said terminal device and the base station or data from which the distance can be determined. The distance can denote the distance between the terminal device and the base station at the time point in which the observation data set was generated by the terminal device.

Further, a base station position and/or a base station position area is determined, i.e. estimated, depending on the determined position and distance. Preferably, the base station position area and/or the base station position is determined depending on multiple observation data sets, in particular depending on multiple positions and distances.

Based on the position of the terminal device and the distance, an area around the position of the terminal device can be determined, i.e. estimated, in which the base station of the cell is located (estimated base station position area). The area can be in the form of a circle or disc or an annulus with a radius corresponding to the distance, wherein the distance can e.g. be determined as a function of the propagation time of a signal transmitted between the base station and the terminal device. Other forms are possible too. It is further possible to determine an overlapping portion of multiple areas, i.e. of multiple estimated base station position areas, which are determined based on multiple different observation data sets. The base station position area can correspond to said overlapping portion. It is further possible to additionally take account of tolerances when estimating the position and/or area. For example, the size of the estimated base station position area can be increased by a predetermined percentage and/or to add a tolerance margin around the area with the minimum possible size, wherein the area with increased size is subsequently used for evaluation of the base station position-related criterion.

It is further possible that the base station position area is determined depending on or as the position of the terminal device if no distance information or a zero distance information is provided which results in a potential base station position estimate. In this case, the base station position area can be provided by a sub portion of the overlapping portion with a minimum or estimated size, wherein all the potential base station position estimates are located in the sub portion.

If no distance information is provided, the distance can preferably be determined depending on a signal strength of a signal transmitted by the base station of the cell to which the observation data set is assigned. This will be exemplarily explained later.

This advantageously allows a robust and sufficiently accurate determination of a base station position area and/or a base station position which, in turn, positively affects evaluation of the position-related criterion.

In another embodiment, the distance is determined based on a TA-related parameter (timing advance-related parameter) if the observation data set comprises said TA-related parameter. The TA can encode a length of time a signal takes to reach the base station from the terminal device. A value of the TA-related parameter is normally between 0 and 63, wherein each step represents an advance of approximately 3.69 microseconds or a distance of approximately 550 m. The value of the TA-related parameter is usually determined by the base station and transmitted to the terminal device. In this case, the terminal device can integrate data encoding the TA-related parameter into an observation data set which is then again transmitted to the base station.

Using the TA-related parameter advantageously allows a computationally fast determination of the distance between the terminal device and the base station for generating observation data by the terminal device without involving other, more complicated distance measuring schemes.

The term timing advance is based on terminology used for a signal transmission according to the GSM standard. The distance determination based on a TA-related parameter, however, also applies to other signal transmission standards. Therefore, the timing advance-related parameter generally denotes a parameter which, as stated before, represents or encodes a length of time a signal takes to reach the base station from the terminal device.

In another embodiment, the distance is set to a preset value or to a signal strength-dependent value if the observation data set comprises no TA-related parameter. The signal strength-dependent value can be determined as a function of the signal strength of the signal transmitted by the base station of the cell to which the observation data set is assigned.

The preset value can be zero or a non-zero value. The signal strength-dependent value can be inversely proportional to the signal strength or a ratio between the signal strength and the maximal signal strength which is generatable by the respective base station.

It is e.g. possible that the distance is set to zero or to a small non-zero value if the signal strength of a communication signal which is transmitted between the terminal device and the base station, in particular from the base station to the terminal device, is higher than a predetermined threshold value. In this case that the distance is set to zero, it can be assumed that the position of the terminal device results in a potential base station position estimate. In such a case, the base station position area can be determined as an area with a size of zero and a position corresponding to the position of the terminal device. A base station position in this case can correspond to the position of the terminal device.

It is further possible that if the observation data set comprises no TA-related parameter and if the signal strength is less than or equal to the predetermined threshold value, the corresponding observation data set can be discarded from determining the base station position area and/or the base station position.

This advantageously provides a fall-back if no distance information is provided by the observation data set, wherein the base station position and/or base station position is still determinable with a desired accuracy.

Further, the base station position and/or the base station position area can be determined depending on only observation data sets of the cell-specific collection with a distance between a terminal device which provided the observation data set and the base station that is smaller than a predetermined threshold. The predetermined threshold can e.g. be 2 km. This advantageously increases an accuracy of the determination of the base station position area and/or the base station position as only observation data sets providing a sufficiently accurate determination are considered.

In another embodiment, the first and the further collection are assigned to one cell, i.e. the merging is performed, if at least one time-related criterion is fulfilled. An evaluation of a time-related criterion can e.g. be enabled by the time stamp which is encoded by one or more observation data sets of the two cell-specific collections. This advantageously increases a merging quality and thus the data quality of the cellular network data base.

In another embodiment, the time-related criterion is fulfilled if the latest observation data set of the first collection and the latest observation data set of the further collection were generated not more than a time period of preset duration ago.

The preset duration can e.g. be equal to 6 months. This advantageously decreases a time required for the merging analysis of the data base since old collections are excluded from the evaluation of the merging criterions.

Alternatively or in addition, time-related criterion is fulfilled if a lifetime of the observation data set of the first collection and the lifetime of the further collection are both higher than a predetermined threshold, e.g. a value of a few days, e.g. a value of three days, four days, five days or ten days or a value up to weeks. The lifetime can denote the period in time in which observation data sets of the collection were generated. A duration of the lifetime of a collection can denote the time difference between the time point of the generation of the oldest observation data set and the time point of the generation of the latest observation data set of the respective collection. This advantageously increases the merging quality since timewise incorrectly detected cells can be excluded from the merging.

Alternatively or in addition, the time-related criterion is fulfilled if the lifetime of the first collection is disjoint from the lifetime of the further collection. In particular, the lifetimes are disjoined if none of the observation data sets assigned to one of both cells were observed at the same time or within a common time period. It can be assumed that observation data sets assigned to the cell before and after renaming will not be generated in the same time period. Therefore, this further increases advantageously a merging quality since it is assured that only cells which existed in different, non-overlapping time periods are considered for merging.

Alternatively or in addition, a time-related criterion is fulfilled if a time gap between the lifetime of the first collection and the lifetime of the further collection is smaller than a predetermined threshold. This advantageously further increases the merging quality. In the case of renaming it can be assumed that the cell after the renaming process will be detected shortly after the renaming process has been performed. Thus, the time gap-related criterion advantageously ensures that the cells considered for merging are cells resulting from a renaming process.

It is, of course, possible to take account of tolerances when evaluating the time-related criterion.

In a preferred embodiment, a cell merging step is performed periodically. In particular, the cell merging step can be performed by running a background algorithm on the data stored in the data base. A periodicity can e.g. be equal to one cell merging step per day, one cell merging step per week or one cell merging step per month.

Alternatively, the cell merging step can be conducted after a certain amount of new observation data sets have been inserted to the data base. The inserted amount can be equal to one or preferably higher than one.

This advantageously ensures a good quality of the data stored in the data base and thus a determination of the position of a terminal device with a sufficient accuracy.

In another embodiment, the cell-identifying information of the collection with the oldest observation data set is replaced by the cell-identifying information of the remaining, e.g. younger, collection. This can mean that the cell-identifying information of one, some or all observation data sets of the respective collections are replaced by the cell-identifying information of the remaining (younger) collection.

In other words, only the new cell-identifying information are used in the data base and thus for a subsequent determination of the position of a terminal device. This advantageously decreases the storage capacity required for providing the data base.

In an alternative embodiment, the cell-identifying information of the collection with the oldest observation data set is added to the cell-identifying information of the remaining (younger) collection. In this case, the resulting (merged) collection of observation data sets can be labeled by two cell-identifying information. Further, if the cell-identifying information is part of an observation data set, the observation sets can comprise both identifying information.

It can be the case that a cell with an initial cell-identifying information is renamed to a cell with a new cell-identifying information (first renaming). Then, said cell can be renamed into a cell with the initial cell-related identifying information again (second renaming). As the cell-identifying information is kept for each cell also in the case of renaming, this advantageously allows to more quickly identify cells after renaming since the cell-identifying information of the cell before the first renaming are partially equal to the cell-identifying information after the second renaming.

In other words, a renaming of a cell can lead to an additional naming of said cell in ongoing use. In this case cell-identifying information for a collection or for observation data sets of a collection can be retained, in particular for a later usage. It is e.g. possible that a cell renaming and/or a merging of two cell-specific collections is undone. This can e.g. be the case if further observation data sets, i.e. observation data sets provided after the renaming and/or merging, are considered, in particular by evaluation of the aforementioned criteria also based on said further observation data sets. If such an evaluation leads to the result that the cells are different and the difference is not a result of a renaming, the assignment can be undone and the respective observation data sets can be re-assigned to two different cells and two cell-specific collections can be re-provided. Further, the retained cell-identifying information can be used for the re-provided collections or the collection-specific observation data sets.

In another embodiment, a data set-specific base station position area and/or a data set-specific base station position is/are determined depending on a selected, e.g. single, observation data set of a cell-specific collection. The selected observation data set is discarded, e.g. deleted or not considered for a subsequent determination of the base station position area and/or base station position, if the distance between the data set-specific base station position and a collection-specific base station position is higher than a predetermined threshold value and/or if the data set-specific base station position area does not correspond to the collection-specific base station position area at least partially. An exemplary correspondence criterion for base station position areas has been explained before.

The data-set specific base station area and/or position can be determined as explained before, wherein determination is based only on the selected observation data set (or its information content).

The collection-specific base station position area can be a base station position area which is already known, e.g. determined as explained before. In particular, the collection-specific base station position area can be determined depending on more than one but not all or depending on all observation data sets of the cell-specific collection which are different from the selected observation data set.

Alternatively or in addition, a data set-specific cell coverage area is determined depending on a selected, e.g. single, observation data set of a cell-specific collection. The selected observation data set is discarded, e.g. deleted or not considered for a subsequent determination of the cell coverage area, if the data set-specific cell coverage area does not correspond to the collection-specific cell coverage area at least partially. An exemplary correspondence criterion for cell coverage areas has been explained before.

The data-set specific cell coverage area and/or position can be determined as explained before, wherein determination is based only on the selected observation data set (or its information content).

The collection-specific cell coverage area can be a cell coverage area which is already known, e.g. determined as explained before. In particular, the collection-specific cell coverage area can be determined depending on more than one but not all or depending on all observation data sets of the cell-specific collection which are different from the selected observation data set.

It is possible to evaluate the discarding criterion for all observation data sets of one collection.

It is of course possible to take account of tolerances when determining the cell-specific coverage area and/or the data set-specific coverage area and/or the cell-specific base station area and/or the data-set specific coverage area and/or the cell-specific base station position and/or the data set-specific base station position.

This advantageously allows to detect incorrect observation data sets, e.g. observation data sets which comprise data encoding an incorrect position of the terminal device and/or data encoding an incorrect distance information, in particular an incorrect TA-related parameter. This, in turn, further increases a data quality of the data base and thus the determination of the position of a terminal device using said data base.

Further proposed is a system for managing a cellular network data base for determining a position of a terminal device. The system comprises at least one data storing means, e.g. one or more memory units. Further, the system comprises at least one data processing means. The data processing means can e.g. be provided by at least one processing unit, e.g. a micro-controller.

Further, multiple observation data sets are stored by the at least one data storage means. In particular, the multiple observation data sets can be stored in form of a data base. Further, one or more observation data set (s) is/are assigned to one cell of the cellular network. Such an assignment can also be stored in the at least one data storage means.

Further, a first collection of the observation data sets comprise at least one observation data set which is assigned to a first cell, wherein a further collection of the observation data sets comprises at least one observation data set which is assigned to a further cell. Further, at least one cell-identifying information and at least one cell position-related information are determinable for each collection.

Further, the first collection and the further collection are assignable, e.g. by means of the at least one data processing means to one cell if at least one cell-identity criterion and at least one cell coverage-related criterion and/or at least one base station position-related criterion is fulfilled. At least one cell identity-related criterion, the at least one cell coverage-related criterion and/or the at least one base station position-related criterion can be evaluated by means of the at least one data processing means. The cell-identifying information, the cell coverage-related information and/or the base station position-related information can be determined by the at least one data processing means.

The assignment, i.e. information thereon, from the collections to one cell, e.g. the same cell, can also be stored in the at least one data storage means if the mentioned criteria is fulfilled.

The system can further comprise at least one observation data set receiving means. Said observation data set receiving means receive an observation data set from at least one transceiver of the cellular network, in particular from at least one base station. It is also possible that the transceiver of the cellular network provides at least a part of the observation data set receiving means.

Further, the system can comprise or provide for signal interfaces to terminal devices being part of the cellular network. Thus, terminal devices can generate an observation data set and transmit the observation data set to the system via the signal interfaces.

It is further possible that a new observation data set is insertable into the cellular network data base, e.g. by means of the at least one data processing means. This and corresponding advantages have been explained before.

The system can advantageously perform a method for managing the cellular network data base according to one of the embodiments disclosed in this disclosure. Thus, the system is designed such that one of the disclosed methods can be performed by the system.

Further described is a method for determining a position of a terminal device being part of the cellular network. A cellular network data base is managed according to a method according to one of the embodiments disclosed in this disclosure. Further, a terminal device transmits a position request signal. The position request signal can be provided by or comprise so-called fingerprint data. Fingerprint data can comprise the same data as observation data except data encoding a position of the terminal device. Thus, finger print data can also comprise fingerprint data sets. Obviously, the position request signal can also comprise or be provided by a observation data generated by the terminal device. The position request signal is transmitted to at least one data processing means, e.g. the afore-mentioned data processing means of the system for managing the cellular network data base.

Further, the position of the terminal device is determined depending on the position request signal and the cellular network data base, in particular on the entries of the cellular network data base.

It is, for instance, possible to match the positioning request signal (or its information content) to one or more entries, in particular observation data sets, of the data base according to some predefined matching criterion/matching criteria. It is possible to match the fingerprint data sets of the positioning request signal to observation data sets which are each assigned to one cell or which are assigned to different cells.

It is then possible to determine a position estimate of the terminal device depending on data encoding the position of the terminal devices which generated the stored observation data sets.

It is also possible to apply the method described in the document J. Benikovsky et al., "Localization in real GSM network with fingerprinting utilization, In mobile light weight wireless systems", pages 699-709, © Springer, 2010, which allows to estimate a current position of a terminal device using fingerprint data provided by a terminal device. In particular, the current position can be estimated by correlating fingerprint data, in particular information encoded by the fingerprint data set, which is provided by a terminal device at a certain time point with a stored observation data, in particular with (corresponding) information encoded by said observation data. The current position can be determined based on the position information encoded by the stored observation data sets, in particular the stored observation data sets which fulfill a correlation-related criterion.

Further described is a system for determining a position of a terminal device being part of a cellular network, wherein the system comprises a system for managing the cellular network according to one of the embodiments disclosed in this disclosure. Further, the system can comprise at least one further data processing means for determining the position based on the position request signal of the terminal device and the data base. The system advantageously allows to perform the described method for determining a position of the terminal device. The system can further comprise a signal interface for position request signals of terminal devices.

BRIEF DESCRIPTION OF THE DRAWING FIGURES

The invention will be described with reference to the attached figures.

Figure 2:
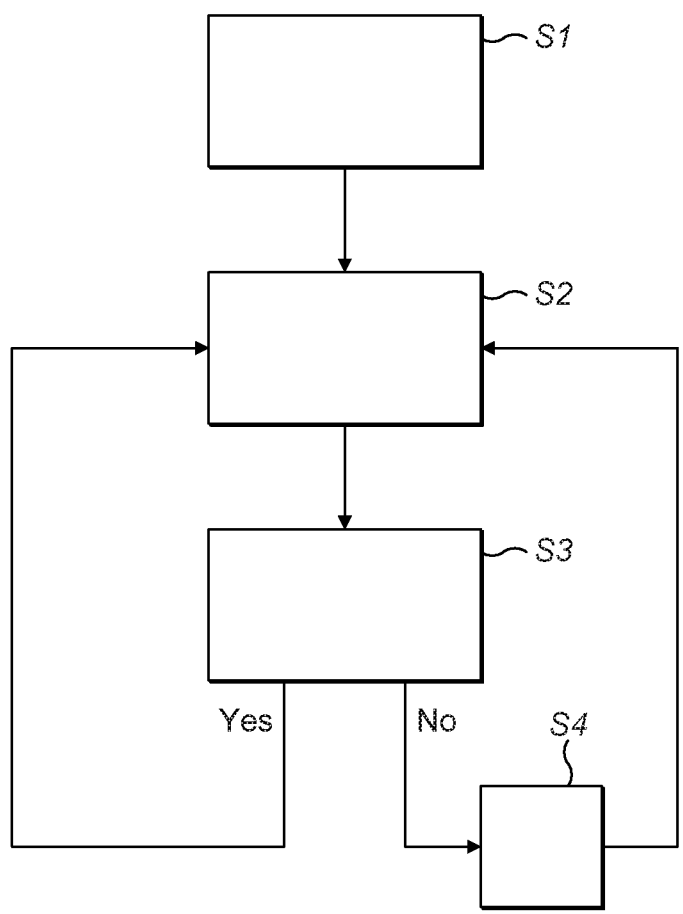
Figure 3:
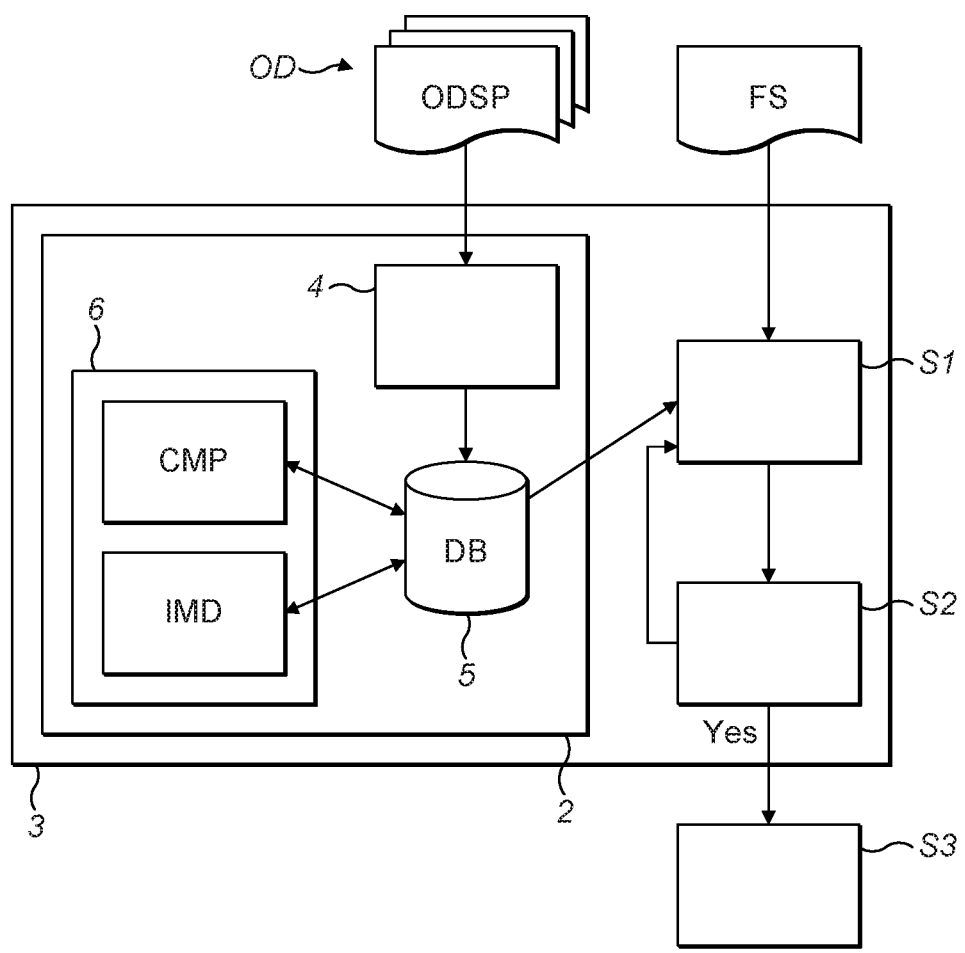
Figure 4:
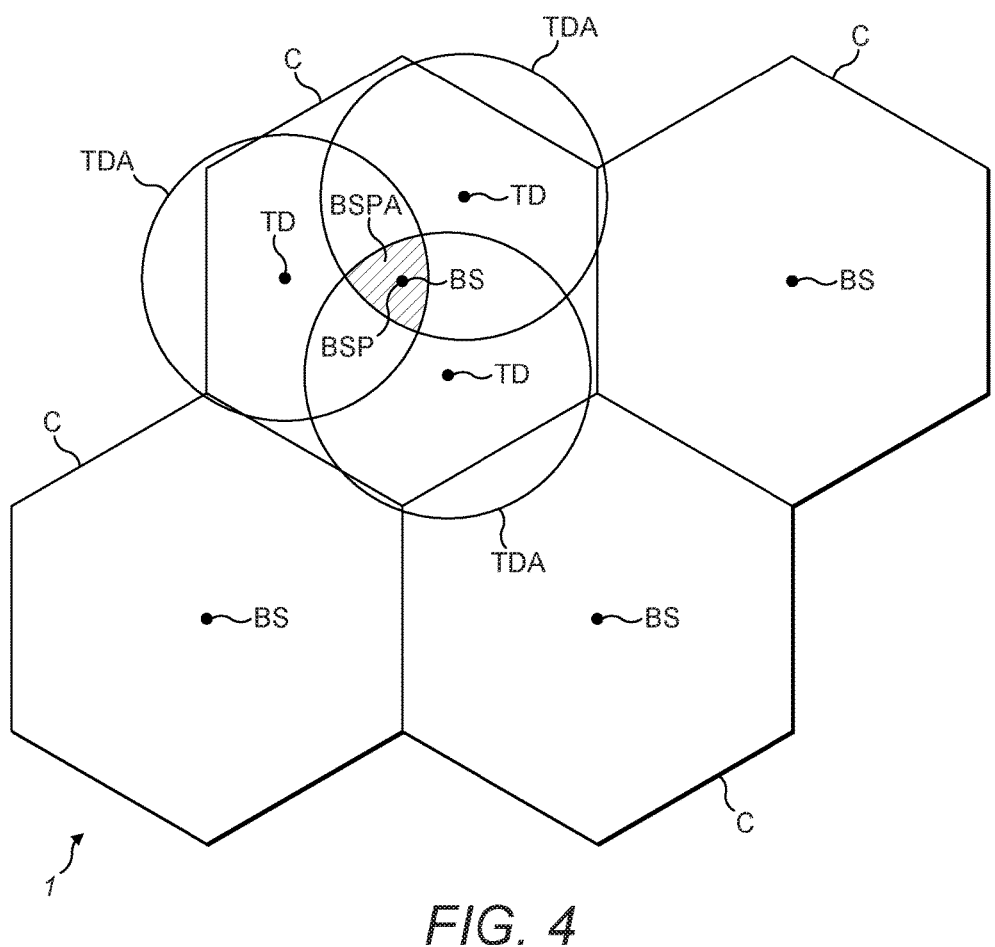

The figures show:

FIG. 1 a schematic flow diagram of a cell merging process,

FIG. 2 a schematic flow diagram of an incorrect observation data set detection,

FIG. 3 a schematic functional block diagram of a fingerprint-based position determination system and FIG. 4 a schematic illustration of a base station position determination.

DETAILED DESCRIPTION OF THE PREFERRED EMBODIMENTS

In the following the same reference numerals denote elements with the same or similar technical features.

FIG. 1 shows a schematic flow diagram of a method for managing a cellular network data base DB (see FIG. 3) according to the invention. The method can also be referred to as cell merging process CMP.

The data base DB comprises multiple observation data sets ODSP (see FIG. 3), wherein one or more observation data set(s) ODSP (Observation Data Set with data encoding a Position) is/are assigned to one cell C of the cellular network 1 (see FIG. 4). The cellular network 1 is composed of multiple cells C. A base station position BSP of a cell C can correspond to a position of a base station BS of the respective cell C, in particular in a global reference coordinate system, e.g. a GNSS-coordinate system. Terminal devices TD (see FIG. 4) can receive signals of one or more base station(s) BS of the cellular network 1. A so-called serving cell can be the cell C of the base station BS to which a communication link is established. Via said communication link, signals and data can be transmitted from or to the terminal device TD.

A terminal device TD can generate an observation data OD, wherein observation data OD can comprise one, preferably more, observation data set(s) ODSP. Observation data OD can comprise data encoding so-called fingerprint of the terminal device TD. Further, observation OD can comprise data encoding a position of the terminal device TD, in particular in the afore-mentioned global reference coordinate system. Such a position can e.g. be determined by position determining means of the terminal device TD, in particular a GNSS of the terminal device TD.

Such observation data set OD can be transmitted to a system 2 (see FIG. 3) for managing the cellular network data base DB. Said system 2 for managing the cellular network data base DB can be part of a system 3 for determining a position of the terminal device TD.

For each cell C of the cellular network 1, the system 2 for managing the data base DB can comprise or determine data encoding a cell coverage-related information, data encoding at least one cell-identifying information and data encoding at least one base station position-related information.

The cell-identifying information can e.g. be provided by one or more cell-identifying parameter. The cell coverage-related information can e.g. be an information on the cell coverage area, e.g. a position, size and/or shape of a cell coverage area of the cell C. The base station position-related information can e.g. be an information on a position of the base station BS and/or on the area in which the base station BS is located, e.g. on the position, size and/or shape of said area.

Such data can e.g. be determined from the observation data sets ODSP stored in the database DB, in particular from observation data sets ODSP assigned to the cell C, and can also be stored in the database DB. In particular in the case of a data transmission according to the GSM standard, the data encoding the cell-identifying information can e.g. comprise one, preferably more than one cell-identifying parameter, in particular one or more of the following parameters: MCC, MNC, LAC, CI, BSIC, ARFCN. Further, one or more observation data set (s) ODSP is/are assigned to a cell C of the cellular network 1 by means of the data base DB. These observation data sets ODSP can be stored in at least one data storage means in order to provide the data base DB.

The observation data sets ODSP of the observation data OD can comprise data encoding a position of the terminal device TD which generated the observation data OD can be inserted into the data base DB. This is indicated by an insertion step 4 (see FIG. 3).

Each observation data ODSP set can comprise data encoding a current position of the terminal device, data encoding cell-identifying information of the specific cell C for which the signal transmitted by the base station BS of the specific cell is receivable by the terminal device TD, data encoding a signal strength of the signal received from said base station BS of the respective cell and a timing advance-related parameter if the terminal device TD is connected to a serving cell which provided a timing advance parameter and a time stamp of the observation data set generation. Observation data OD can comprise observation data sets ODSP comprising data encoding cell-identifying information of different cells C.

An observation data set ODSP can be assigned to one cell C if at least the cell-identifying information encoded by the observation data set ODSP correspond to the cell-identifying information of the cell C.

Further, e.g. by means of the data base DB, a first collection of observation data sets ODSP comprises at least one observation data set ODSP which is assigned to a first cell C and a further collection of observation data sets ODSP comprises at least one observation data set ODSP which is assigned to a further cell C. Further, the respective cell-identifying information, the at least one cell coverage-related information and the at least one base station position-related information are determined for each collection.

In a first step S1 of the proposed method, a first collection of observation data sets ODSP is selected, wherein the observation data set(s) ODSP of the first collection are assigned to a first cell C of the network 1.

In a second step S2 of the method, a further collection of at least one observation data set ODSP is selected, wherein the observation data set(s) ODSP of the further collection is/are assigned to a further cell C, wherein the cell-identifying information of both cells C are at least partially different from each other.

In a third step S3, a cell identity-related criterion is evaluated. In particular, the cell-identifying information of the first and the further collection are determined and compared, wherein the cell identity-related criterion is fulfilled if a predetermined identity measure is reached. In particular, the cell-identifying parameters of both collections can be determined and compared. The cell identity-related criterion is fulfilled if at least one cell-identifying parameter or all except one, two or three cell-identifying parameters of both collections are equal.

If the cell identity-related criterion is not fulfilled, the method turns to the second step S2, wherein a further (third) collection is selected.

If the cell identity-related criterion is fulfilled, a cell coverage-related criterion and/or a base station position-related criterion is evaluated in a fourth step S4.

In particular, a cell coverage area is determined, i.e. estimated, for the first and the further cell C. The coverage area of a cell C can e.g. be determined as a function of the position of the terminal device TD which generated the observation data sets ODSP assigned to the respective cell C and which is encoded by the respective observation data set ODSP. In particular, the coverage area can be an area comprising the position(s) of the terminal device TD encoded by one, preferably more than one but not all, more preferably all observation data sets ODSP of the cell-specific collection. The coverage area can also have a predetermined shape, e.g. the shape of a circle, a disc or a circle segment.

The cell coverage-related criterion is fulfilled if the coverage area of the first cell C corresponds to the coverage area of the further cell C at least partially. The coverage area of the first cell can correspond to the coverage area of the further cell at least partially if the coverage areas overlap at least partially, e.g. by a predetermined non-zero percentage, e.g. by at least 25%, 50% or 75%, of one of the coverage areas, in particular of the smaller one.

Further, the cell coverage-related criterion is alternatively or in addition fulfilled if a dimension of an area composed of the cell coverage area of the first cell C and the cell coverage area of the further cell C is smaller than a predetermined threshold which can be chosen depending on the characteristics of the cellular network 1.

Further, a base station position BSP and/or a base station position area BSPA of the cell C to which the observation data sets ODSP of the respective collection are assigned, is determined, i.e. estimated.

It is, for instance, possible that the base station position area BSPA and/or the base station position BSP is determined depending on a terminal device position information and a distance information encoded by data of the observation data set ODSP.

It is possible, as outlined before, that a terminal device TD generates an observation data set ODSP which comprises data encoding the position of the terminal device TD. Further, the terminal device TD can generate an observation data set ODSP which comprises data encoding a distance of the terminal device TD to a base station BS, in particular to the base station BS of the serving cell C. Such a distance can e.g. be provided by or determined from a timing advance (TA)-related parameter. Such a TA-related parameter is provided from the base station BS of a serving cell C to a terminal device TD in order to synchronize communication. In particular, the base station BS can instruct the terminal device TD to advance its transmission timing by a certain amount compared to the time of receipt of the downlink frame time of the signal from the base station BS. This compensates for the round trip propagation time from the base station BS to the terminal TD, and back again, and ensures that signals from all terminal devices TD are synchronised to arrive at the base station BS at approximately the same time.

It is thus possible that the terminal device TD generates an observation data set ODSP with data encoding a TA-related parameter. In this case, the distance can be determined based on the TA-related parameter if the observation data set ODSP comprises said TA-related parameter.

Based on the terminal device position and the terminal device-specific distance encoded or determined from at least one observation data set ODSP, a base station position area BSPA can be determined.

As shown in FIG. 4, a terminal device-related distance and the terminal device position allows to determine a terminal device-related area TDA (shown as a circle in FIG. 4) wherein the position of the base station BS, i.e. the base station position BSP, is assumed to be arranged in the terminal device-related area TDA. This terminal-device related area TDA can also be referred to as estimated base station location area.

If terminal device-related areas TDA are determined for multiple observation data sets ODSP of a collection, an overlapping portion of said terminal device-related areas TDA can be determined wherein the overlapping area corresponds to the base station position area BSPA. Such an overlapping portion is indicated by a hatched area in FIG. 4. It is possible to determine the base station position area BSPA from only one, from a predetermined non-zero percentage or from all observation data sets ODSP of one collection assigned to a specific cell C.

If no distance information, e.g. a TA-related parameter, can be provided or encoded by the terminal device TD, the distance can be determined as a function of a signal strength of the signal connection between terminal device TD and the base station BS of the respective cell C. It is possible that an observation data set ODSP of said terminal device TD can comprise data encoding the position of the terminal device TD. Further, the observation data set ODSP can comprise data encoding a signal strength of the signal connection between terminal device TD and the base station of the respective cell C. The distance can be inversely proportional to the signal strength. Depending on this signal strength-dependent distance, the terminal device-related area TDA and consequently the base station position area BSPA can be determined. Alternatively, the distance can be set to zero or a preset non-zero value if the observation data set ODSP comprises no TA-related parameter.

It is possible that the base station position BSP and/or the base station position area BSPA is determined depending only on observation data sets ODSP of the cell-specific collection for which the terminal device-related distance is smaller than a predetermined threshold.

In such a way, the base station position BSP and/or the base station position area BSPA can be determined for each of both collections.

If only a base station position area BSPA is determinable, the base station position BSP can be determined as geometric center of the base station position area BSPA.

Then, position-related criterion is fulfilled if a distance between a base station position BSP of the first cell C and the base station position BSP of further cell C is smaller than a predetermined threshold. Alternatively or in addition, the position-related criterion is fulfilled if a base station position area BSPA of the first cell and a base station position area BSPA of the further cell C overlap at least partially for example by more than a non-zero percentage, in particular by 10 percent, of the area of the smaller base station position area BSPA.

Further, the position-related criterion is alternatively or in addition fulfilled if a dimension of an area composed of the base station position area BSPA of the first cell C and the base station position area BSPA of the further cell C is smaller than a predetermined threshold which can be chosen depending on the characteristics of the cellular network 1.

If the position-related criterion is not fulfilled, the method returns to the second step S2 wherein a further (third) collection is selected.

If one or both, the cell coverage-related criterion and the base station position-related criterion, is/are fulfilled, the first and the further collection are assigned to one cell C, in particular, to the same cell C, in a fifth step S5. This assignment can also be referred to as cell merging. In particular, the cell-identifying information of the collection with the oldest observation data set ODSP can be replaced by the cell-identifying information of the remaining collection. In other words, the observation data set(s) ODSP of the first collection are merged with the observation data set(s) ODSP of the further collection, wherein the cell-identifying information of the younger collection is assigned to the merged collection.

Alternatively, the cell-identifying information of the collection of the oldest observation data set ODSP is added to the cell-identifying information of the remaining collection. In other words, the cell-identifying information are fused.

After the fifth step S5, the method can return to the first step S1, wherein another first collection is selected.

The proposed method can be performed periodically.

FIG. 2 shows a schematic flow diagram of an incorrect measurement detection IMD process (see FIG. 3).

In a first step S1, a collection-specific base station position area BSPA and/or a collection-specific base station position BSP (see FIG. 4) and/or a collection-specific cell coverage area are determined from at least predetermined percentage, but not all, observation data sets ODSP assigned to a specific cell C as outlined before.

In a second step S2, one observation data ODSP set of the cell-specific collection is selected. Preferably, the observation data sets ODSP used to determine the collection-specific base station position area BSPA and/or the collection-specific base station position BSP and/or the collection-specific cell coverage area does not include the selected observation data set ODSP.

Then, an observation data set-specific base station position area B SPA and/or an observation data set-specific base station position BSP is determined for the selected observation data set ODSP of the cell-specific collection in a third step S3. This determination can be performed as outlined before but only using the selected observation data set ODSP.

The selected observation data set ODSP for which the observation data set-specific base station position area BSPA and/or base station position BSP is determined is not considered further in a fourth step S4 if the observation data set-specific base station position area BSPA and the collection-specific base station position area BSPA do not correspond at least partially, e.g. do not overlap by at least a predetermined non-zero percentage. This can include the scenario that the data set-specific base station position BSP is not located in the collection-specific base station position area B SPA.

That an observation data set is not considered further can e.g. mean that it is not considered for a subsequent evaluation of a cell coverage-related criterion and/or at least one base station position-related criterion, in particular not considered for a subsequent determination, i.e. estimation, of a coverage area and/or a base station position and/or a base station position area.

Alternatively or in addition, the selected observation data set ODSP is not considered further in the fourth step S4 if the distance between the observation data set-specific base station position BSP and the collection-specific base station position BSP is higher than a predetermined threshold value.

If the observation data set-specific base station position area BSPA and the collection-specific base station position area BSPA do correspond at least partially and/or if the distance is smaller or equal to the predetermined threshold value, the selected observation data set ODSP can be kept.

Further, an observation data set-specific cell coverage area is determined depending on a selected observation data set ODSP of a cell-specific collection in the third step S3. This determination can be performed as outlined before but only using the selected observation data set ODSP.

Alternatively or in addition, the selected observation data set ODSP is not considered further if the data set-specific cell coverage area does not correspond to the collection-specific cell coverage area at least partially, e.g. do not overlap by at least a non-zero percentage. This can include the scenario that the position of the terminal device TD which generated the observation data set ODSP is not located in the collection-specific cell coverage area. If the observation data set-specific cell coverage area and the collection-specific cell coverage area do correspond at least partially, the selected data set ODSP can be kept.

FIG. 3 shows a functional schematic block diagram of a fingerprint-based position determination system 3 which provides a system for determining a position of the terminal device TD.

The system 3 comprises the system 2 for managing a cellular network data base DB. The system 2 further comprises a data storage means 5 and at least one data processing means 6. The data processing means 6 can be provided by a micro-controller. The data storage means 5 can be provided by one or more memory unit (s). Schematically indicated is that the data processing means 6 can perform a cell merging process CMP, in particular periodically. Such a cell merging process CMP is provided by the method according to the embodiment shown in FIG. 1. Further, the data processing means 6 can perform an incorrect measurement detection IMD, wherein the incorrect measurement detection IMD corresponds to a method according to the embodiment shown in FIG. 2.

Further shown is observation data OD which comprises multiple observation data sets ODSP, wherein each of these data sets ODSP comprises data encoding a position of a terminal device TD which generated the respective observation data ODSP. These observation data sets ODSP can be inserted into the data base DB by an insertion step 4.

Further schematically shown is a flow diagram of a position determination of a terminal device TD. A terminal device TD (see FIG. 4) can provide a fingerprint signal FS which can correspond to observation data OD without data encoding a position of a terminal device TD. Such fingerprint signal FS can be part of or provide a position request signal.

Such a position request signal can be provided to the system 3 and position determination candidate data sets can be filtered from the observation data sets ODSP which are stored in the data base DB in a first step S1. In a second step S2, a matching criterion can be evaluated for all candidate data sets determined in the first step S1. If the matching criterion is fulfilled, a position of the terminal device TD can be determined in a third step S3 as a position of the terminal device TD which provided the observation data set ODSP which fulfilled the matching criterion. If the matching criterion is not fulfilled, a further matching candidate observation data set ODSP is selected and evaluated in the second step S2.

FIG. 4 shows a schematic layout of a cellular network 1. Indicated are cells C of the cellular network 1 and base stations BS of each cell C. Schematically shown is a cell coverage area of each cell, wherein the coverage area is a hexagonal area. It is, of course, understood that the cell coverage area can have another shape. Further, the cellular network 1 can comprise more than the shown cells C. Further shown are terminal devices TD and terminal device-related areas TDA related to the terminal devices TD. The terminal device-related areas TDA are shown as circles, where it is understood that these terminal device-related areas TDA can also have other forms or shapes, e.g. the shape of a disc. A maximum radius of the disc can be equal to a distance of the terminal device TD to a base station BS of the respective cell C or larger than said distance. As mentioned before, the distance can e.g. be calculated or determined from TA-related parameter.

Further indicated is a base station position area B SPA, wherein the base station BS is arranged in the base station position area BSPA. Further shown is a base station position BSP which corresponds to the position of the base station BS.

What is claimed is:

1. A method for managing a cellular network database (DB) for determining a position of a terminal device (TD), wherein the database (DB) comprises multiple observation data sets (ODSP) stored on at least one data storage means, the method comprising:
    assigning one or more observation data set(s) (ODSP) to one cell (C) of a cellular network (1) by means of a data processing means provided by at least one processing unit and storing said assignment in the data storage means, including assigning at least one observation data set (ODSP) of a first collection of observation data sets (ODSP) to a first cell, and assigning at least one observation data set (ODSP) of a further collection of observation data sets (ODSP) to a further cell (C), and the data processing means determining at least one cell-identifying information and at least one cell coverage-related information and/or at least one base station position-related information for each collection, and assigning the first collection and the further collection to one cell (C) when at least one cell identity-related criterion and at least one cell coverage-related criterion and/or at least one base station position-related criterion is fulfilled;
    wherein each observation data set is provided by a terminal device or determined depending on observation data generated and provided by said terminal device.

2. The method according to claim 1, characterized in that the cell-identifying information of each collection comprises at least one cell-identifying parameter, wherein the cell identity-related criterion is fulfilled if the at least one cell-identifying parameter of the first collection is different from the at least one cell-identifying parameter of the further collection.

3. The method according to claim 2, characterized in that the cell-identifying information of each collection comprises more than one cell-identifying parameter, wherein the cell identity-related criterion is fulfilled if at least one cell-identifying parameter of the first collection is equal to a cell-identifying parameter of the further collection.

4. The method according to claim 1, characterized in that the cell coverage-related criterion is fulfilled if a coverage area of the first cell corresponds to a coverage area of the further cell at least partially and/or if a dimension of an area composed of the coverage area of the first cell and the coverage area of the further cell is smaller than a predetermined threshold.

5. The method according to claim 1, characterized in that the base station position-related criterion is fulfilled if a difference between a base station position (BSP) of the first cell (C) and the base station position (BSP) of the further cell (C) is smaller than a predetermined threshold and/or if a base station position area (BSPA) of the first cell (C) corresponds to the base station position area (BSPA) of the further cell (C) at least partially and/or if a dimension of an area composed of the base station position area (BSPA) of the first cell (C) and the base station position area (BSPA) of the further cell (C) is smaller than a predetermined threshold.

6. The method according to claim 1, characterized in that for an observation data set (ODSP) of a cell-specific collection, a position of the terminal device (TD) which provided the observation data set (ODSP) and a distance between said terminal device (TD) and a base station (BS) of said cell (C) is determined, wherein a base station position area (BSPA) and/or a base station position (BSP) is determined depending on the determined position and distance.

7. The method according to claim 6, characterized in that the distance is determined based on a Timing Advance (TA)-related parameter if the observation data set (ODSP) comprises a TA-related parameter.

8. The method according to claim 6, characterized in that the distance is set to a preset value or to a signal strength-dependent value if the observation data set (ODSP) comprises no TA-related parameter.

9. The method according to claim 1, characterized in that the first collection and the further collection are assigned to one cell (C) if at least one time-related criterion is fulfilled.

10. The method according to claim 9, characterized in that the time-related criterion is fulfilled if the latest observation data set (ODSP) of the first collection and the latest observation data set (ODSP) of the further collection was generated not more than a time period of a predetermined duration ago and/or if a duration of a lifetime of the first collection and a duration of the lifetime of the further collection are both higher than a predetermined threshold and/or if the lifetime of the first collection is disjoint from the lifetime of the further collection and/or if a time gap between a lifetime of the first collection and the lifetime of the further collection is smaller than a predetermined threshold.

11. The method of claim 1, characterized in that a cell merging step is performed periodically.

12. The method according to claim 1, characterized in that the cell-identifying information of the collection with the oldest observation data set (ODSP) is replaced by the cell-identifying information of the remaining collection.

13. The method according to claim 1, characterized in that the cell-identifying information of the collection with the oldest observation data set (ODSP) is added to the cell-identifying information of the remaining collection.

14. The method according to claim 6, characterized in that a data set-specific base station position area (BSPA) and/or a data set-specific base station position (BSP) and/or a data set-specific cell coverage area is determined depending on a selected observation data set (ODSP) of a cell-specific collection, wherein the selected observation data set (ODSP) is not considered further if the distance between the set-specific base station position (BSP) and a collection-specific base station position (BSP) is higher than a predetermined threshold value and/or if the data set-specific base station position area (BSPA) does not correspond to the collection-specific base station position area (BSPA) at least partially and/or if the data set-specific cell coverage area does not correspond to the collection-specific cell coverage area at least partially.

15. A system (2) for managing a cellular network database (DB) for determining a position of a terminal device (TD), wherein the system (2) comprises at least one data storing means (5) and at least one data processing means (6) comprising at least one processing unit, and multiple observation data sets (ODSP) that are stored by means of the data processing means at least one processing unit on the at least one data storage means, wherein one or more of the said multiple observation data set(s) (ODSP) is/are assigned to one cell (C) of a cellular network (1) by means of the data processing means at least one processing unit, wherein a first collection of observation data sets (ODSP) comprises at least one observation data set (ODSP) which is assigned to a first cell (C) by means of the data processing means at least one processing unit, wherein a further collection of observation data sets (ODSP) comprises at least one observation data set (ODSP) which is assigned to a further cell (C) by means of the data processing means at least one processing unit, wherein at least one cell-identifying information and at least one cell coverage-related information and/or at least one base station position-related information is determinable for each collection, wherein the first collection and the further collection are assigned to one cell (C) by means of the data processing means at least one processing unit if at least one cell identity-related criterion and at least one cell coverage-related criterion and/or at least one base station position-related criterion is fulfilled, wherein each observation data set is provided by a terminal device or determined depending on observation data generated and provided by said terminal device.

16. The method according to claim 4, characterized in that the base station position-related criterion is fulfilled if a difference between a base station position (BSP) of the first cell (C) and the base station position (BSP) of the further cell (C) is smaller than a predetermined threshold and/or if a base station position area (BSPA) of the first cell (C) corresponds to the base station position area (BSPA) of the further cell (C) at least partially and/or if a dimension of an area composed of the base station position area (BSPA) of the first cell (C) and the base station position area (BSPA) of the further cell (C) is smaller than a predetermined threshold.

17. The method according to claim 5, characterized in that for an observation data set (ODSP) of a cell-specific collection, a position of the terminal device (TD) which provided the observation data set (ODSP) and a distance between said terminal device (TD) and a base station (BS) of said cell (C) is determined, wherein a base station position area (BSPA) and/or a base station position (BSP) is determined depending on the determined position and distance.

18. The method according to claim 7, characterized in that the distance is set to a preset value or to a signal strength-dependent value if the observation data set (ODSP) comprises no TA-related parameter.

19. The method according to claim 16, characterized in that for an observation data set (ODSP) of a cell-specific collection, a position of the terminal device (TD) which provided the observation data set (ODSP) and a distance between said terminal device (TD) and a base station (BS) of said cell (C) is determined, wherein a base station position area (BSPA) and/or a base station position (BSP) is determined depending on the determined position and distance.

20. The method according to claim 10, characterized in that a data set-specific base station position area (BSPA) and/or a data set-specific base station position (BSP) and/or a data set-specific cell coverage area is determined depending on a selected observation data set (ODSP) of a cell-specific collection, wherein the selected observation data set (ODSP) is not considered further if the distance between the set-specific base station position (BSP) and a collection-specific base station position (BSP) is higher than a predetermined threshold value and/or if the data set-specific base station position area (BSPA) does not correspond to the collection-specific base station position area (BSPA) at least partially and/or if the data set-specific cell coverage area does not correspond to the collection-specific cell coverage area at least partially.

* * * * *